(12) United States Patent
Liu et al.

(10) Patent No.: US 10,605,301 B2
(45) Date of Patent: Mar. 31, 2020

(54) SECONDARY CLAMPING DEVICE FOR WHEEL

(71) Applicant: CITIC Dicastal CO., LTD, Qinhuangdao (CN)

(72) Inventors: Weidong Liu, Qinhuangdao (CN); Shengchao Zhang, Qinhuangdao (CN); Haiping Chang, Qinhuangdao (CN); Yingfeng Wang, Qinhuangdao (CN); Yeling Tian, Qinhuangdao (CN); Dan Yao, Qinhuangdao (CN); Zegong He, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 150 days.

(21) Appl. No.: 15/839,215

(22) Filed: Dec. 12, 2017

(65) Prior Publication Data
US 2019/0032705 A1    Jan. 31, 2019

(30) Foreign Application Priority Data

Jul. 31, 2017 (CN) .......................... 2017 1 0635513

(51) Int. Cl.
| | |
|---|---|
| *B27H 7/00* | (2006.01) |
| *F16C 13/02* | (2006.01) |
| *F16C 9/04* | (2006.01) |
| *B60B 35/18* | (2006.01) |
| *F16C 31/00* | (2006.01) |
| *F16C 21/00* | (2006.01) |

(52) U.S. Cl.
CPC ............ *F16C 13/022* (2013.01); *B60B 35/18* (2013.01); *F16C 9/04* (2013.01); *B60B 2380/20* (2013.01); *B60B 2380/70* (2013.01); *B60B 2380/80* (2013.01); *F16C 21/00* (2013.01); *F16C 31/00* (2013.01); *F16C 2226/10* (2013.01)

(58) Field of Classification Search
USPC ......................................... 157/14, 18, 20, 21
See application file for complete search history.

(56) References Cited

U.S. PATENT DOCUMENTS

| | | | | |
|---|---|---|---|---|
| 6,502,834 B1 * | 1/2003 | Fukui | .................... | B23B 31/201 |
| | | | | 279/156 |
| 7,204,493 B1 * | 4/2007 | Gatton | ...................... | B23B 5/28 |
| | | | | 157/16 |
| 10,029,314 B1 * | 7/2018 | Wu | ......................... | B25B 5/163 |

FOREIGN PATENT DOCUMENTS

| | | |
|---|---|---|
| CN | 201073738 Y | 6/2008 |
| CN | 102990455 A | 3/2013 |

(Continued)

*Primary Examiner* — Joseph J Hail
*Assistant Examiner* — Shantese L McDonald
(74) *Attorney, Agent, or Firm* — Calfee, Halter & Griswold LLP

(57) ABSTRACT

Disclosed is a secondary clamping device for a wheel. Two bearings and a spacing ring are closed in a base by a bearing end cover, a shaft sleeve is mounted on the bearings, a linear bearing and a gland are fixed on the shaft sleeve, a positioning pin is fixed at the top of the floating shaft, two ends of the spring A are respectively connected with the positioning pin and the linear bearing, and the positioning pin can move up and down under the action of the spring A. A pull rod is fixed on the gland, the outer wall of the floating column is connected with the inner hole of the shaft sleeve, two ends of the spring B are respectively connected with the gland and the floating column.

1 Claim, 2 Drawing Sheets

(56) References Cited

FOREIGN PATENT DOCUMENTS

| | | | | |
|---|---|---|---|---|
| CN | 203918051 U | | 11/2014 | |
| CN | 204603904 | * | 9/2015 | ............... B23Q 3/12 |

* cited by examiner

SECONDARY CLAMPING DEVICE FOR WHEEL

CROSS-REFERENCE TO RELATED APPLICATIONS

This application claims priority to Chinese Patent Application No. 201710635513.3, filed on Jul. 31, 2017, which is hereby incorporated by reference in its entirety.

TECHNICAL FIELD

The present application relates to a wheel machining device, specifically to a high-precision secondary clamping device for a wheel.

BACKGROUND ART

With rapid development of automobile industry, the requirements of various large automobile factories in the world market for automobiles are increasingly high. Wheels serving as important components of an automobile are important parts meeting the requirements of the whole automobile for safety, comfort, energy conservation, attractiveness, low noise and the like. Aluminum alloy wheels are increasingly applied to automobiles due to the characteristics of excellent material performance, light weight, good heat dissipation, rich and attractive appearance styles and the like.

SUMMARY OF THE INVENTION

The present application is aimed at providing a secondary clamping device for a wheel.

A secondary clamping device for a wheel in the present application comprises a shaft sleeve, a linear bearing, a positioning pin, a spring A, a floating shaft, a nut, a pressure plate, a pull rod, a floating column, a spring B, a bearing end cover, bearings, a spacing ring, a gland and a base. The two bearings and the spacing ring are closed in the base by the bearing end cover, wherein the two bearings are connected by the spacing ring. The shaft sleeve is mounted on the bearings, the linear bearing and the gland are fixed on the shaft sleeve, the floating shaft passes through the linear bearing and the spring A in sequence, the positioning pin is fixed at the top of the floating shaft, the upper part of the positioning pin is of a positive cone structure, two ends of the spring A are respectively connected with the positioning pin and the linear bearing, and the positioning pin can move up and down under the action of the spring A. The pull rod is fixed on the gland, the pull rod 8 passes through the spring B and the inner hole of the floating column, the outer wall of the floating column is connected with the inner hole of the shaft sleeve, the upper end face of the floating column is of a positive conical surface structure, two ends of the spring B are respectively connected with the gland and the floating column, and the floating column can float up and down under the action of the spring B. The pressure plate is mounted on the pull rod by the nut.

Before actual use, the nut and the pressure plate are detached from the pull rod. In actual use, when a wheel is put on the device, a central hole and a bolt hole of the wheel are respectively aligned with the floating column and the floating shaft, the upper conical surface of the floating column and the upper conical surface of the floating shaft are completely attached to the central hole and the bolt hole of the wheel under the gravity of the wheel and the actions of the spring A and the spring B, then the pressure plate is compressed onto the front side of the wheel by the nut so that the wheel moves down, finally, the flange surface of the wheel is in contact with the upper end face of the floating column, so far, the clamping operation of the wheel is completed, and machining of the wheel begins.

The present application may meet the requirement for secondary positioning of the wheel in use, and has the characteristics of ideal effect, high efficiency and high safety and reliability in work.

Figure 1:
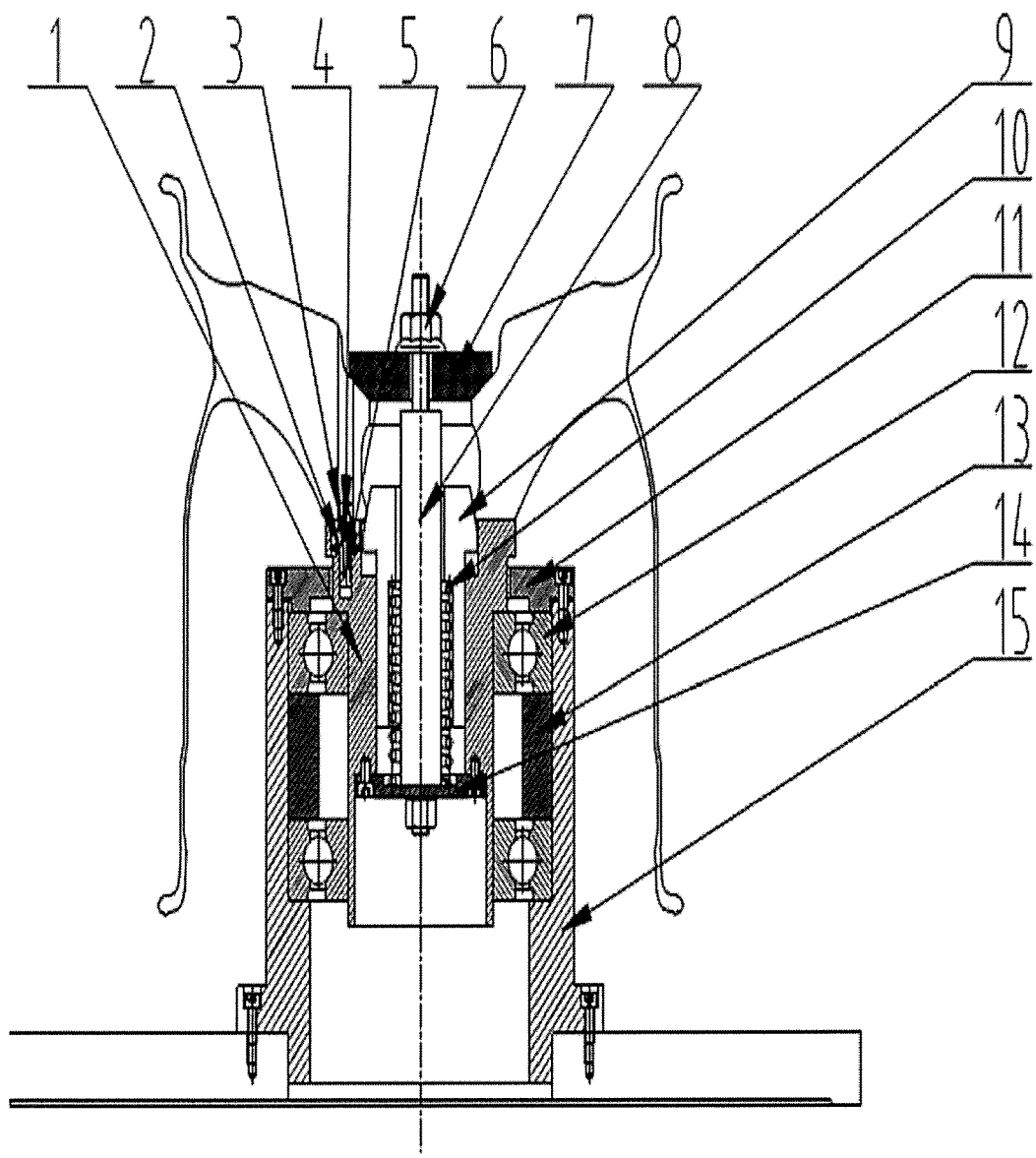
FIG. 1 is a structural schematic diagram of a secondary clamping device for a wheel in the present application.
Figure 2:
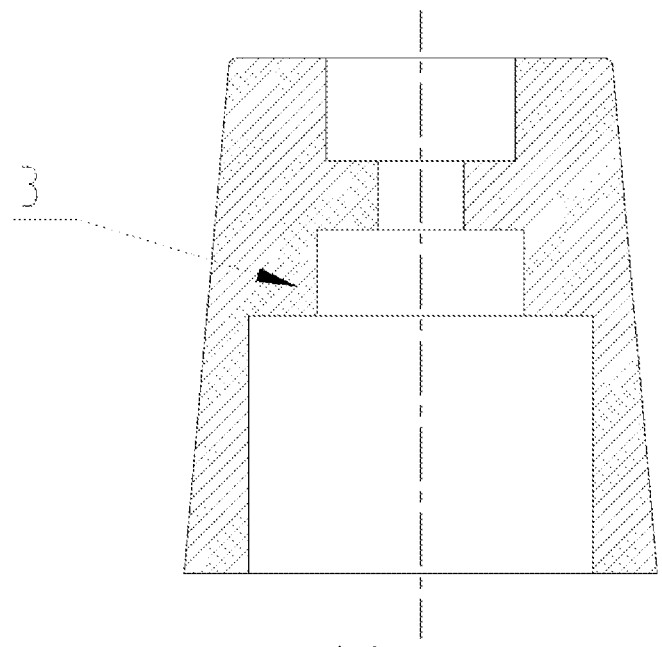
FIG. 2 is a structural schematic diagram of a positioning pin in the present application.
Figure 3:
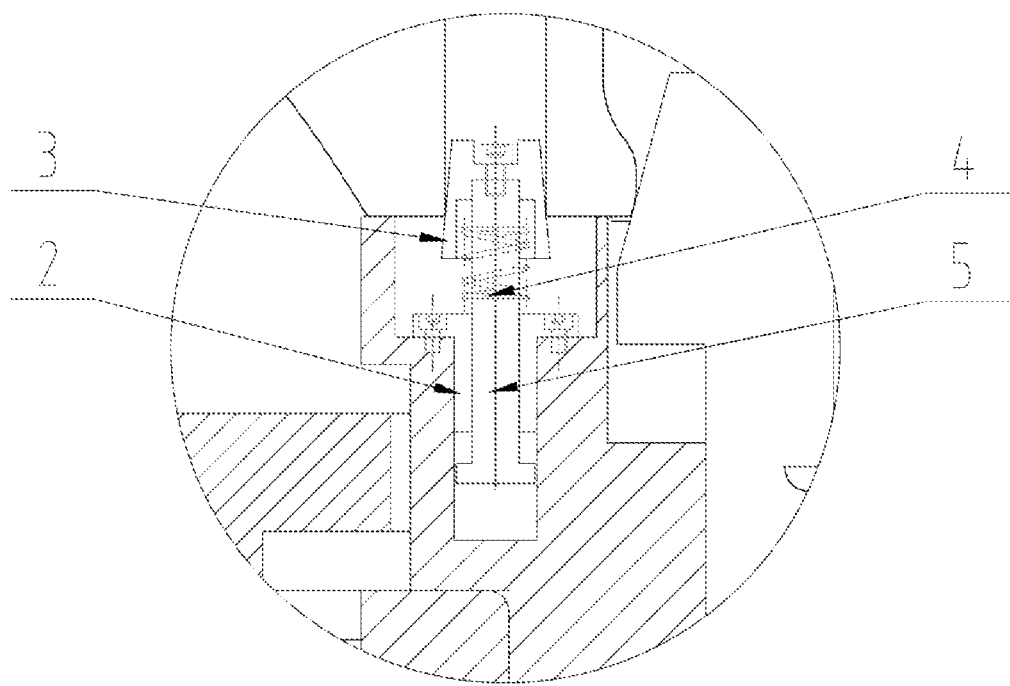
FIG. 3 is a partial enlarged view of FIG. 1 in the present application.

In figures: 1—shaft sleeve, 2—linear bearing, 3—positioning pin, 4—spring A, 5—floating shaft, 6—nut, 7—pressure plate, 8—pull rod, 9—floating column, 10—spring B, 11—bearing end cover, 12—bearing, 13—spacing ring, 14—gland, 15—base.

DETAILED DESCRIPTION OF THE INVENTION

Details and working conditions of a specific device provided by the present application will be described in detail below in combination with the accompanying drawing.

A secondary clamping device for a wheel in the present application comprises a shaft sleeve 1, a linear bearing 2, a positioning pin 3, a spring A 4, a floating shaft 5, a nut 6, a pressure plate 7, a pull rod 8, a floating column 9, a spring B 10, a bearing end cover 11, bearings 12, a spacing ring 13, a gland 14 and a base 15. The two bearings 12 and the spacing ring 13 are closed in the base 15 by the bearing end cover 11, wherein the two bearings 12 are connected by the spacing ring 13. The shaft sleeve 1 is mounted on the bearings 12, the linear bearing 2 and the gland 14 are fixed on the shaft sleeve 1, the floating shaft 5 passes through the linear bearing 2 and the spring A 4 in sequence, the positioning pin 3 is fixed at the top of the floating shaft 5, the upper part of the positioning pin 3 is of a positive cone structure, two ends of the spring A 4 are respectively connected with the positioning pin 3 and the linear bearing 2, and the positioning pin 3 can move up and down under the action of the spring A 4. The pull rod 8 is fixed on the gland 14, the pull rod 8 passes through the spring B 10 and the inner hole of the floating column 9, the outer wall of the floating column 9 is connected with the inner hole of the shaft sleeve 1, the upper end face of the floating column 9 is of a positive conical surface structure, two ends of the spring B 10 are respectively connected with the gland 14 and the floating column 9, and the floating column 9 can float up and down under the action of the spring B 10. The pressure plate 7 is mounted on the pull rod 8 by the nut 6.

Before actual use, the nut 6 and the pressure plate 7 are detached from the pull rod 8. In actual use, when a wheel is put on the device, a central hole and a bolt hole of the wheel are respectively aligned with the floating column 9 and the floating shaft 5, the upper conical surface of the floating column 9 and the upper conical surface of the floating shaft 5 are completely attached to the central hole and the bolt hole of the wheel under the gravity of the wheel and the actions of the spring A 4 and the spring B 10, then the pressure plate 7 is compressed onto the front side of the wheel by the nut 6 so that the wheel moves down, finally, the flange surface of the wheel is in contact with the upper end face of the floating column 9, so far, the clamping operation of the wheel is completed, and machining of the wheel begins.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A secondary clamping device for a wheel, comprising a shaft sleeve, a linear bearing, a positioning pin, a spring A, a floating shaft, a nut, a pressure plate, a pull rod, a floating column, a spring B, a bearing end cover, bearings, a spacing ring, a gland and a base, wherein the two bearings and the spacing ring are closed in the base by the bearing end cover, and the two bearings are connected by the spacing ring; the shaft sleeve is mounted on the bearings, the linear bearing and the gland are fixed on the shaft sleeve, the floating shaft passes through the linear bearing and the spring A in sequence, the positioning pin is fixed at the top of the floating shaft, the upper part of the positioning pin is of a positive cone structure, two ends of the spring A are respectively connected with the positioning pin and the linear bearing, and the positioning pin is configured to move up and down under the action of the spring A; the pull rod is fixed on the gland, the pull rod passes through the spring B and an inner hole of the floating column, the outer wall of the floating column is connected with the inner hole of the shaft sleeve, the upper end face of the floating column is of a positive conical surface structure, two ends of the spring B are respectively connected with the gland and the floating column, and the floating column is configured to float up and down under the action of the spring B; and the pressure plate is mounted on the pull rod by the nut;

before actual use, the nut and the pressure plate are detached from the pull rod, and in actual use, when a wheel is put on the device, a central hole and a bolt hole of the wheel are respectively aligned with the floating column and the floating shaft, the upper conical surface of the floating column and the upper conical surface of the floating shaft are completely attached to the central hole and the bolt hole of the wheel under the gravity of the wheel and the actions of the spring A and the spring B, then the pressure plate is compressed onto the front side of the wheel by the nut so that the wheel moves down, finally, the flange surface of the wheel is in contact with the upper end face of the floating column, so far, the clamping operation of the wheel is completed, and machining of the wheel begins.

\* \* \* \* \*